United States Patent [19]

Albanese

[11] Patent Number: 4,630,256

[45] Date of Patent: Dec. 16, 1986

[54] BIDIRECTIONAL DUAL NETWORK

[75] Inventor: Andres Albanese, Middletown, N.J.

[73] Assignee: AT&T Bell Laboratories, Murray Hill, N.J.

[21] Appl. No.: 724,941

[22] Filed: Apr. 19, 1985

Related U.S. Application Data

[63] Continuation of Ser. No. 357,772, Mar. 12, 1982, abandoned.

[51] Int. Cl.$^4$ .............................................. H04B 9/00
[52] U.S. Cl. .......................................... 370/3; 370/85; 370/86; 455/607; 455/612
[58] Field of Search ............... 455/606, 607, 610, 612; 370/1, 3, 4, 85, 86, 87, 88, 89

[56] References Cited

U.S. PATENT DOCUMENTS

| | | | |
|---|---|---|---|
| 4,089,584 | 5/1978 | Polczynski | 350/96.16 |
| 4,090,067 | 5/1978 | Bell, III et al. | 455/607 |
| 4,161,786 | 7/1979 | Hopkins et al. | 364/900 |
| 4,186,380 | 1/1980 | Edwin et al. | 455/612 |
| 4,210,780 | 7/1980 | Hopkins et al. | 370/80 |
| 4,317,614 | 3/1982 | Palmer | 455/612 |
| 4,432,088 | 2/1984 | Frankel | 370/85 |

FOREIGN PATENT DOCUMENTS 2808937  9/1979  Fed. Rep. of Germany ........ 370/85

OTHER PUBLICATIONS

Campbell-Multiterminal Fiber Systems-Laser Focus-Jun. 1978, pp. 42, 44, 45.
Kraft-A 1 M Bit/Sec Data Loop for Security Sites-Conf. ICC '80, 1980 Inter. Conf. on Comm., Seattle, Wash. (8-12 Jun. 1980), pp. 14.3.1-14.3.5.
Trover-Fiber Optical Communications in Data Acquisition/Control Systems Conf. Inter. Instrumentation Symposium, Seattle, Wash., (5-8 May, 1980), pp. 675-691.

Primary Examiner—Joseph A. Orsino, Jr.
Attorney, Agent, or Firm—Bernard Tiegerman

[57] ABSTRACT

Two, operationally independent networks are established along a common transmission bus by having the signals for the respective networks propagate in opposite directions, and directionally coupling the station units of the respective networks to the transmission bus so as to receive and transmit signals in one of the two directions. The two networks can operate at different bit rates and wavelengths and, being operationally independent, can be installed and added to at different times.

8 Claims, 3 Drawing Figures

BIDIRECTIONAL DUAL NETWORK

This application is a continuation, of application Ser. No. 357,772, filed Mar. 12, 1982 now abandoned.

TECHNICAL FIELD

This invention relates to digital bus communication networks.

BACKGROUND OF THE INVENTION

Because of the proliferation of computers, word processing equipment, and a host of other data terminals installed at different locations within a building or community, techniques for communicating among them, without using the telephone company switching network, have been developed. Examples of such multiple access communication networks are described in U.S. Pat. Nos. 4,161,786; 4,089,584 and 4,210,780. All of these various systems typically include a transmission bus along which there are located a plurality of subscribers. The bus is organized in two, oppositely directed, unidirectional signal paths. One constitutes the "talk" path into which signals from the several subscriber station are launched. The other path constitutes the "listen" path from which the several subscribers receive signals. A central controller allocates the network resources, controlling access to the network and assigning time slots to the respective subscribers.

In view of the ever increasing number and variety of data terminals, the goals of any information distribution system for the foreseeable future must be twofold. First, the system must be designed to make efficient use of the facilities and equipment on hand. Second, it must be designed to permit efficient and graceful rearrangement and growth of the network as both the size of the network and the sophistication of the equipment served increase.

SUMMARY OF THE INVENTION

The present invention is directed to means for increasing both the size and data handling capacity of multiple-access communication systems. In accordance with the invention, two, operationally independent networks are established along a common transmission bus by transmitting signals in opposite directions. Each network comprises a plurality of station interface units which are directionally coupled to the transmission bus so that they transmit and receive signals in one or the other of the two signal directions.

It is an advantage of the present invention that the two networks can operate at different bit rates and at different wavelengths. It is a further advantage that they can be organized at different times as the need arises.

DETAILED DESCRIPTION

Figure 1:
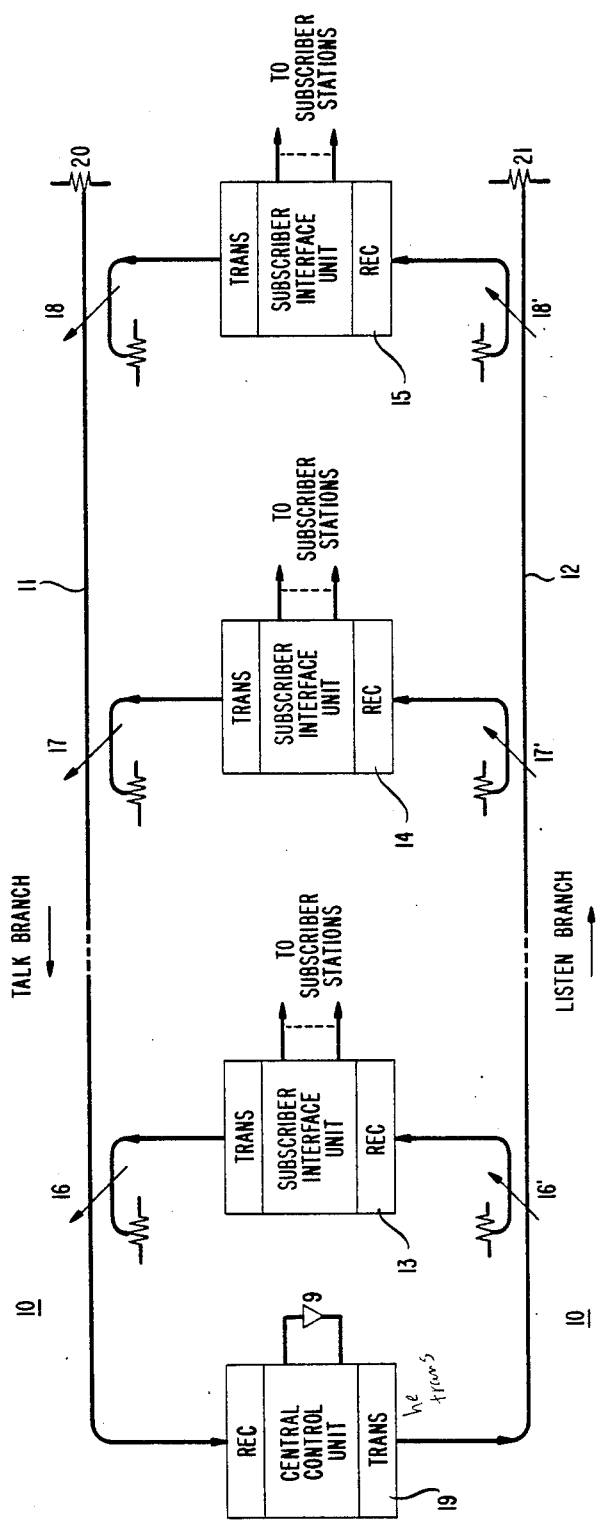
FIG. 1 shows a prior art multiple-access communication network.

Referring to the drawings, FIG. 1 shows a prior art multiple-access communication network comprising an open loop transmission bus 10 which is divided into two branches 11 and 12. Branch 11 is the so-called "talk" branch in which signals flow from right to left. Branch 12 is the so-called "listen" branch in which signals flow from left to right.

A plurality of station interface units (SIU) 13, 14 and 15, each of which is connected to a multiplicity of subscriber stations, are connected between the two branches by means of pairs of directional couplers 16—16', 17—17' and 17—18' such that signals are directionally coupled into and out of the transmission bus in the correct sense, as indicated by the arrows. Station equipment, though not shown, can include a variety of services including computers, telephones, video equipment, etc.

The output end of the talk branch and the input end of the listen branch are connected to a central control unit (CCU). The opposite (i.e., open) ends of the two branches are match-terminated by impedances 20 and 21 so as to minimize reflections in the network. In an alternative arrangement (not shown) the central control unit can be located anywhere along the transmission bus 10. However, inasmuch as a regenerator 9 is advantageously located at the junction of the two branches, it is convenient to locate the regenerator and CCU together, as shown in FIG. 1.

The purpose of the central control unit is to allocate among the station interface units, at their request, the resources of the network. Precisely what this entails will vary from system to system. In general, it will include maintaining up-to-date tables of the state of the network and of the network configuration. Subject to availability, as indicated by these tables, channels will be assigned to the station interface units upon request. Advantageously, the CCU will perform no switching. As a consequence it can be simple in construction. Furthermore, once a circuit is established between subscriber stations, the CCU is no longer involved, and because it does not operate on the subscriber's data, it imposes no constraints on data rate, data format, type of modulation or type of multiplexing.

Figure 2:
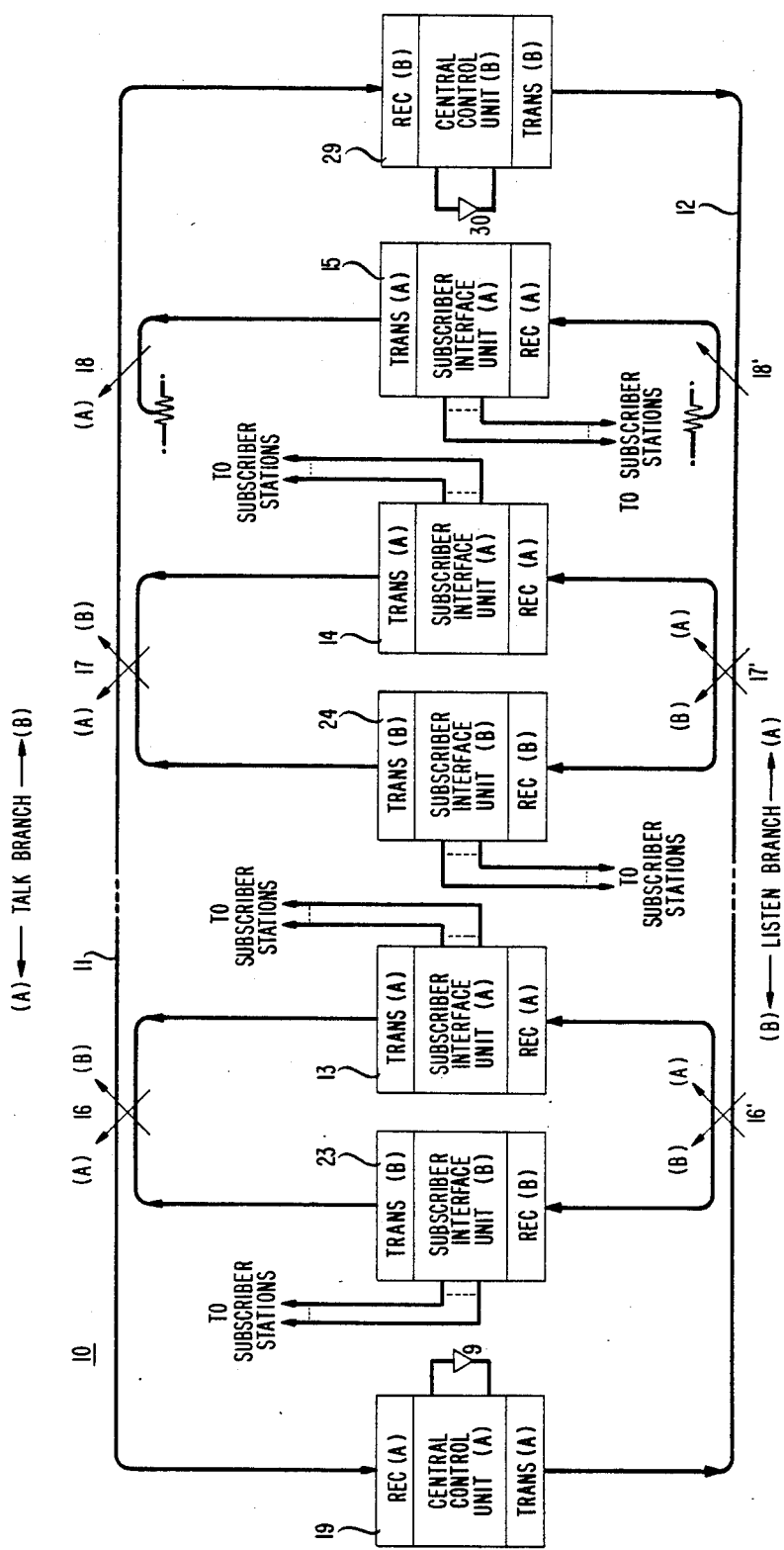
FIG. 2 shows a bidirectional, dual, multipleaccess network in accordance with the present invention.

A network of this general type has a finite capacity which is limited by the SIUs. If the network needs, after a time, exceed this capacity, these units must either be reprogrammed, if they are computers, or replaced. The present invention provides an alternative approach wherein a second network is superimposed upon the existing network without any disruption in the original network. The manner in which this is done is illustrated in FIG. 2. In this figure, the same identification numerals are used to identify corresponding components in FIG. 1. In addition, the description of the components include the suffix (A) or (B). Thus, the network of FIG. 2 comprises, as in FIG. 1, a transmission bus 10 having a talk branch 11 and a listen branch 12. A first plurality of station interface units (SIU[A]) 13, 14 and 15 are directionally coupled to the two branches by means of directional couplers 16—16', 17—17' and 18—18', respectively. The connections are made so that transmissions from each SIU (A) transmitter propagates along the talk branch 11 from right to left, as indicated by the (A) identified arrows. Similarly, each SIU(A) is directionally coupled to the listen branch 12 so that only those signals propagating from left to right, as also indicated by the (A) identified arrows, are received by the SIU (A) receivers. As in FIG. 1, central control unit (19) and regenerator 9, associated with the (A) network, are connected between the talk and listen branches.

In the single network configuration, the fourth port of each directional coupler is match-terminated. In the dual network of FIG. 2 these terminations are removed at specified station interface locations, and another station interface unit is connected in their stead. Thus, station interface units 23 and 24 are connected, respectively, to the fourth port of directional couplers 16 and 16', and 17 and 17'. For purposes of illustration, a unit has not been connected between couplers 18 and 18'.

It will be noted that units identified as SIU(B) transmit signals onto the talk branch so as to propagate from left-to-right, and receive signals that propagate along the listen branch from right-to-left. In both cases, as indicated by the (B) identified arrows, this is opposite to the direction of propagation of the corresponding (A) network signals.

To complete the network, a second central control unit (CCU[B]) 29 and associated regenerator 30 are connected at the right hand end of the transmission bus 10, thereby closing one end of the B network loop.

In operations, signals originating at my station associated with an (A) network SIU are transmitted to CCU(A) and regenerator 9 where they are received, acted upon, regenerated, and retransmitted to the receiving ends of the (A) network SIUs. Similarly, signals originating in CCU(A) or regenerated by regenerator 9 are transmitted and received solely by (A) network SIUs.

In like fashion, signals associated with the (B) network are electrically isolated from the (A) network units so that in every sense the two networks are operationally independent in spite of the fact that they share a common transmission bus 10. As such, the two networks can have totally different signal protocols and data rates, and each can be added to as the need arises.

It will be noted in FIG. 1 that one end of each branch 11 and 12 is match-terminated so as to minimize signal reflections in the respective branches. In the embodiment of FIG. 2 there appears to be no terminating impedances as each end of the loop is terminated by a CCU and regenerator. However, the input and output impedances of these units are advantageously designed to provide the desired terminations. Thus, (A) network signals in branch 12 are terminated at the output port of CCU(B) 29 as are (B) network signals at the output port of CCU(A) 19.

Notwithstanding these precautions, there remains the possibility of some crosstalk between the two networks. To insure that this does not occur the operating wavelengths are advantageously different. That is, $\lambda_A \neq \lambda_B$.

Figure 3:
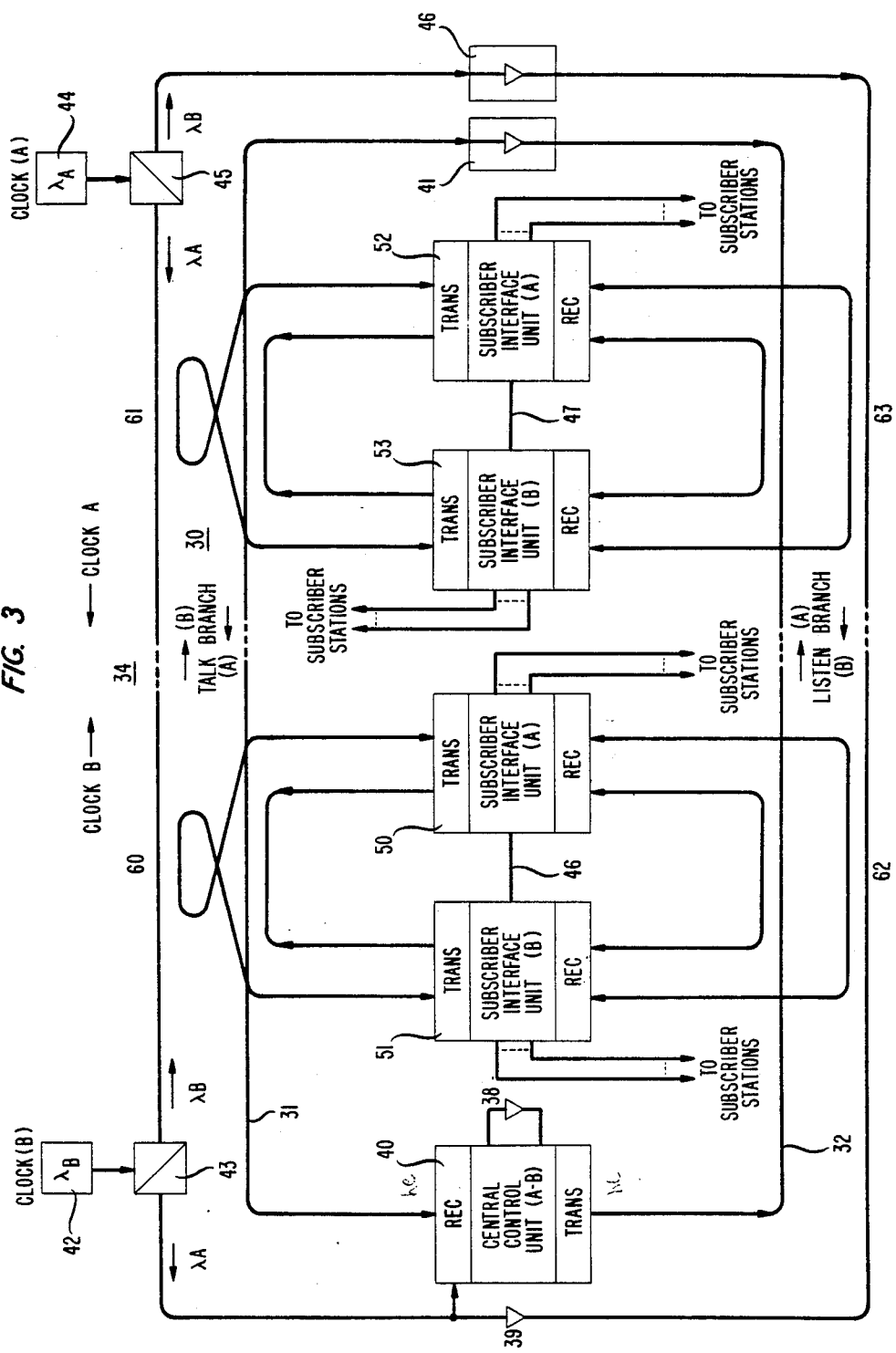
FIG. 3 shows an alternative embodiment of the network of FIG. 2.

FIG. 3 shows an alternate embodiment of the invention incorporating two modifications, each of which can be used independently of the other. As in FIG. 2, there is a common transmission bus 30 with station interface units 50, 51, 52 and 53 directionally coupled between the talk and listen branches 31 and 32 of bus 30. Unlike the embodiment of FIG. 2, however, there is a second transmission bus 34 which is used to transmit timing signals to the various units, as would be the case in a synchronous system. The timing signals are derived from a pair of clock sources 42 and 44. Each source is coupled to a transmission bus 34 by means of a wavelength multiplexer 43 and 45, respectively, which injects the timing signals in the appropriate direction. For example, multiplexer 43 derives (B) network timing signals $t_B$ from source 42 and causes them to propagate in the same direction as the (B) network data signals propagate along transmission bus 30. Similarly, multiplexer 45 derives network timing signals $t_A$ from source 44 and causes them to propagate along bus 34 in the opposite direction. Both diplexers are transparent to transmissions at the wavelength of the other clock source.

The second modification relates to the use of a common CCU for both the (A) and (B) networks. Thus, in the embodiment of FIG. 3, a single CCU (A,B) 40 is provided. In this particular arrangement, the CCU is located at the end of the loop which also includes the (A) network clock regenerator 39 and signal regenerator 38. The (B) network data regenerator 41 and clock regenerator 46 are located at the other end of the loop.

It is evident that if both networks are to be controlled by the same CCU, there must be communication between the two networks. This is provided at the station interface units by connections 46 and 47. These connections are only employed for the purpose of establishing a link between subscribers. Once the link is made, however, communication between subscribers is via their respective station interface units and, in all other respects, the networks are operationally independent.

While the principles of the invention have been described with reference to a particular class of multiple-access networks, it will be understood that the invention is in no sense limited to such networks. It should also be noted that whereas the invention can be implemented at all operating wavelengths, it is of particular interest at optical wavelengths wherein the transmission bus is an optical fiber.

What is claimed is:

1. A communication system, comprising:
a first network, including at least two station units;
a second network, including at least two station units;
means for allocating the resources of said first and second networks;
a communication pathway over which said station units are capable of communicating with each other and with said means; and
wherein said first and second networks are capable of simultaneous operation, and at any point along said pathway common to said station units, signals between the station units of said first network propagate in a direction opposite to that of the signals between the station units of said second network, the latter signals being unrelated to the former signals.

2. The system according to claim 1 wherein said communication pathway
includes an optical fiber.

3. The system according to claim 1 wherein each of said station units includes signal transmitting means and signal receiving means directionally coupled to said communication pathway.

4. The system according to claim 1 wherein said signals are optical signals.

5. The system according to claim 4 wherein the wavelength of
the signals between the station units of said first network is different from the wavelength of the signals between the station units of said second network.

6. The system according to claim 1 wherein said means includes at least one central control unit.

7. The system according to claim 6 wherein each of the station units of said first network includes means for communicating with one of the station units of said second network; and wherein said one central control unit allocates network resources for both networks.

8. The system according to claim 6 wherein said means includes first and second central control units, said first central control unit allocating the resources of said first network and said second central control unit allocating the resources of said second network.

* * * * *